United States Patent [19]

Smith et al.

[11] Patent Number: 5,476,901

[45] Date of Patent: Dec. 19, 1995

[54] SILOXANE MODIFIED POLYOLEFIN COPOLYMERS

[75] Inventors: Steven D. Smith, Fairfield; Andrew J. Wnuk; Margaret S. Gerber, both of Wyoming, all of Ohio

[73] Assignee: The Procter & Gamble Company, Cincinnati, Ohio

[21] Appl. No.: 82,685

[22] Filed: Jun. 24, 1993

[51] Int. Cl.$^6$ .................................................. C08F 8/42
[52] U.S. Cl. ........................ 525/100; 525/102; 526/279
[58] Field of Search ........................................ 525/100, 102

[56] References Cited

U.S. PATENT DOCUMENTS

| | | | |
|---|---|---|---|
| 3,865,897 | 2/1975 | Falender et al. | 260/827 |
| 4,252,915 | 2/1981 | Bartos | 525/106 |
| 4,883,852 | 11/1989 | Masuoka et al. | 526/279 |
| 4,937,110 | 6/1990 | Ohara et al. | 428/34.2 |
| 4,968,750 | 11/1990 | Eichenauer et al. | 525/100 |
| 4,978,436 | 12/1990 | Kelly | 204/165 |
| 5,002,996 | 5/1991 | Okuda et al. | 524/436 |
| 5,017,635 | 5/1991 | Senuma et al. | 524/269 |
| 5,213,743 | 5/1993 | Ohara et al. | 264/171 |

FOREIGN PATENT DOCUMENTS

| | | | |
|---|---|---|---|
| 0254050 | 1/1988 | European Pat. Off. | C08G 77/38 |
| 0334205 | 9/1989 | European Pat. Off. | C08L 23/08 |
| 342311 | 11/1989 | European Pat. Off. | C08G 77/42 |
| 0357037 | 3/1990 | European Pat. Off. | C08F 283/12 |
| 0559515A1 | 9/1993 | European Pat. Off. | C08L 13/00 |
| 50-94488 | 7/1975 | Japan | H01B 3/30 |
| 51-33143 | 3/1976 | Japan | C08L 23/26 |
| 52-43863 | 4/1977 | Japan | |
| 54-27026 | 7/1977 | Japan | |
| 52-137684 | 11/1977 | Japan | H01B 3/44 |
| 53-12944 | 2/1978 | Japan | C08L 23/08 |
| 55-57450 | 4/1980 | Japan | |
| 55-71708 | 5/1980 | Japan | C08F 255/02 |
| 63-89543 | 4/1988 | Japan | C08G 77/40 |
| 63-101428 | 5/1988 | Japan | C08G 81/02 |
| 63-172757 | 7/1988 | Japan | C08L 51/06 |
| 63-289045 | 11/1988 | Japan | C08L 23/00 |
| 64-87683 | 3/1989 | Japan | C09J 7/02 |
| 64-77605 | 3/1989 | Japan | A41B 13/02 |
| 64-56710 | 3/1989 | Japan | C08F 210/02 |
| 1168996 | 7/1989 | Japan | B32B 07/06 |
| 1-196111 | 8/1989 | Japan | C08J 5/18 |
| 278533 | 11/1989 | Japan | C08G 81/02 |
| 2-102283 | 4/1990 | Japan | C08J 9/06 |
| 2-240145 | 9/1990 | Japan | C08J 9/14 |
| 2-274785 | 11/1990 | Japan | C09J 7/02 |
| 97112 | 7/1975 | Poland | C08F 29/04 |

OTHER PUBLICATIONS

Handt, C. M. & D. T. Kelly, "Silicone Technology Taps PSA Market Opportunities", Paper Film & Foil Converter, pp. 76–78, (Oct. 1992).

Sen, A. K., B. Mukherjee, A. S. Bhattacharyya, P. P. De and A. K. Bhowmick, "Kinetics of Silane Grafting and Moisture Crosslinkging of Polyethylene and Ethylene Propylene Rubber", Journal App. Polymer Sci., vol. 44, pp. 1153–1164, (1992).

Primary Examiner—David Buttner
Assistant Examiner—Margaret W. Glass
Attorney, Agent, or Firm—Brahm J. Corstanje; David L. Suter; Jacobus C. Rasser

[57] ABSTRACT

A siloxane modified copolymer with the following general formula:

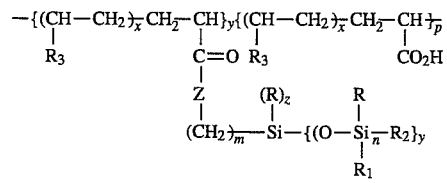

wherein: x=1 to 1000; m=2 to 100; n=0 to 1000; z=0 to 2; y=1 to 3; (z+y)=3; and p=1 to 200; wherein R and $R_1$ are independently selected from the group consisting of hydrogen, alkyl groups having 1 to 6 carbons, phenyl, benzyl or alkylphenyl having from 6 to 12 carbons; $R_2$ is selected from the group consisting of $C_1$ to $C_6$ alkyl, phenyl, benzyl or alkylphenyl having from 6 to 12 carbons; $R_3$ is methyl, ethyl or propyl; and Z is O, S, NH or NR' wherein R' is phenyl, $C_1$ to $C_4$ alkyl or $C_1$ to $C_3$ alkylphenyl. A process for obtaining siloxane modified copolymer comprising:

reactively extruding organosiloxanes having reactive terminal groups with polyolefins having reactive groups, the molar ratio of the functional groups being from about 1:1 to about 1:100,000 in a substantially solvent-free environment at a temperature from about 150° C. to about 350° C. for not more than 1 hour at 50 to 350 rpm.

8 Claims, No Drawings

SILOXANE MODIFIED POLYOLEFIN COPOLYMERS

TECHNICAL FIELD

This invention relates to siloxane modified polyolefin copolymers and a process for making them. The copolymers are used to make dispensing films and plastics for packaging, measuring, and adhesive releasing objects.

BACKGROUND

Siloxane modified polyolefin copolymers have been long known in the art and have various industrial applications. They retain the favorable characteristics of both polysiloxanes and polyolefins. Polysiloxanes are known for their thermostability, chemical stability, low surface energy, and lubricating properties. Poly-α-olefins are chemically stable, have high resistance against physical force, and molding or shaping capability. The α-olefin polymers are usually mixed with other hydrocarbon polymers such as polyethylene and polypropylene. Mixing siloxane polymers with α-olefin polymers leads to leaching; i.e., one polymer forms a layer or film on the other polymer.

Siloxane modified polyolefin copolymers were developed for use as electrical insulating material and as substitutes for polyethylene. The siloxane modified polyolefin copolymers are synthesized by reacting low molecular weight polyolefins with cyclosiloxanes in the presence of catalysts such as Ziegler-Natta catalysts, peroxides and other free radical initiators and at temperatures from 100° to 200° C. These copolymers were also made by melt mixing polyolefins and olefin substituted siloxanes. These products are both graft copolymers and block copolymers.

Another way of combining hydrocarbons and siloxanes is by reacting functional groups attached to each of the oligomers, macromers, polymers or monomers. Carboxylic acids or anhydrides can link with hydroxyl groups to form esters, primary and secondary amines to form amides or imides, primary amines to form imides and tertiary amines to form quaternary amine salts. The amides, imides and esters are more stable than the quaternary ammonium salts. As is to be expected, the ionic link of the quaternary salt hydrolyzes on standing. The chemical bonds found in the esters, imides and amides appear to be quite stable during use.

There have been problems producing chemically bonded siloxane and polyalkyl copolymers. If there is more than one functional group on the silicone oligomer, the product may be unacceptable. Subsequent processing into thin structures, e.g. extruding or co-extruding the material into films or sheets, becomes difficult.

It has now been found that by reacting functional derivatives of siloxanes with substantially one reactive group per molecule and polyolefins polymers containing one or more functional groups, copolymers containing the siloxane functionality and polyethylene or other polyalkyl functionality can be obtained. The oligomers are reacted at defined ratios and under specific temperature and mixing conditions in an extruder. Some difunctional or multifunctional groups can be present. The level of these difunctional or multifunctional groups determines the level of cross linking in the final product. Cross linking can cause problems when forming copolymers into thin films, sheets or bottles. Preferably, monofunctional silicone reactants are used. The copolymers obtained by this method can be mixed directly with other polymers or coextruded with other polymers into multilayer structures, including sheets, films or bottles.

Silicone containing copolymers have a tendency to migrate to the surface of films and plastics. The mixed copolymers made herein acquire surface characteristics of the silicone polymer, but have the advantage that the siloxane is chemically linked to another polymer. Thus the siloxane does not separate or leach out of the film or package as the physical mixtures can. The films and plastics obtained by this invention are particularly useful in packaging, for measuring and dispensing devices, and adhesive releasing materials. They are particularly useful for making bottles for low surface energy liquids.

It is an object of the present invention to provide copolymers which have the favorable characteristics of both polysiloxanes and polyolefins, but are thermoplastic, heat-sealable and more stable than mixtures of the polymers.

It is also an object of the present invention to provide a practical and efficient process to obtain a siloxane modified polyolefin. The process does not require a solvent and therefore is environmentally sound and more economical to run.

It is further an object of the present invention to provide a convenient method of using these siloxane modified polyolefins with other polymers to make films and other plastic articles.

SUMMARY OF THE INVENTION

A process for obtaining siloxane modified polyolefin copolymers comprising:

Reactively extruding organosiloxanes having reactive terminal groups with polyolefins having reactive groups, the molar ratio of the functional groups being from about 1:1 to about 1:100,000 in a substantially solvent-free environment at a temperature from about 150° C. to about 350° C. for not more than 1 hour at 50 to 350 rpm is disclosed.

The resultant copolymer has the following general formula:

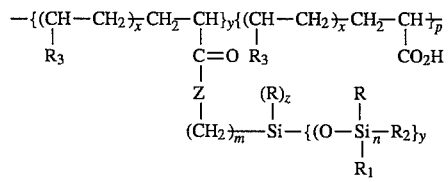

wherein:

x=1 to 1000 m=2 to 100 n=0 to 1000 y=1 to 3, z=0 to 2 wherein (y+z)=3, p=1 to 200 wherein R and $R_1$ are independently selected from the group consisting of hydrogen, alkyl groups having 1 to 6 carbons, phenyl, benzyl or alkylphenyl having from 6 to 12 carbons; $R_2$ is selected from the group consisting of $C_1$ to $C_6$ alkyl, phenyl, benzyl or alkylphenyl having from 6 to 12 carbons; $R_3$ is hydrogen, methyl, ethyl or propyl; and Z is O, S, NH or NR' wherein R' is phenyl, $C_1$ to $C_4$ alkyl or $C_1$ to $C_3$ alkylphenyl.

DETAILED DESCRIPTION OF THE INVENTION

A. Definitions

By "comprising" herein is meant that additional steps may be taken in the processing which do not substantially change the reaction parameters or the product produced by the reaction. The term comprising encompasses the terms "consisting of" and "consisting essentially of". The term also means that the polymer produced by the reaction process may contain other materials or be mixed with other materials but not so that polymer's bulk properties are changed.

By "siloxane" as used herein is meant an organic derivative of polymeric silicon oxide. Preferably the siloxane is a dimethylsiloxane derivative containing one alkyl amino substituent.

By "polyolefin" as used herein is meant a polymer derived from a ethylene or a substituted ethylene. These include propylene, styrene, alkyl styrenes, butylene, butadienes, acrylates and the like.

By "reactive group" as used herein is meant a functional group which will react with a corresponding functional group to form a stable compound. Reactive groups encompass alcohols, thiols, primary and secondary amines which will react with carboxylic acids, carboxylic anhydrides, acid chlorides and isocyanates to form esters, amides, imides and ureas or urethanes.

By "terminal" as used herein is meant that the reactive group is at the end or near the end of the hydrocarbon chain or monomeric unit of the polymer. The reactive group can also be located internally or toward the center of the molecule if it is not sterically hindered.

All percentages herein are by weight unless otherwise indicated. The molecular weights of the polymers are determined by a weight average and are based on average molecular weight.

B. The Reactants

1. Siloxanes

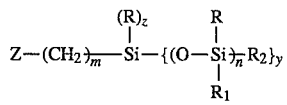

wherein z is selected from the group consisting of $NH_2$, NHR', OH or SH, and wherein R', R, $R_1$ and $R_2$ are independently selected from the group consisting of $C_1$ to $C_6$ alkyl, phenyl, benzyl or alkylphenyl having from 6 to 12 carbons, or hydrogen, and m is from 2 to 100 and n is 0 to 1000, y is from 1 to 3, z is 0 to 2, wherein (y+z)=3.

The preferred polysiloxanes have average molecular weights in the range of 5000 to 300,000, preferably from 8000 to 200,000, most preferably from 9000 to 40,000.

During the preparation of the polysiloxanes, the molecular weight can be controlled within a general range. There will be some molecules present in the polysiloxanes that have more than one functional group $(CH_2)_nX$. On average the functional groups should be a single or monosubstituted product. More highly substituted polysiloxanes to cause the resultant films to form gels, have uneven thickness and limited processability.

A highly preferred polysiloxane is a primary amino substituted polysiloxane wherein R and $R_2$ are methyl; X is an amino group linked by a propyl and n is 70. The average is molecular weight is 10,000 or 30,000. This is an experimental material available from General Electric (U.S., as products 1159-524 and 1149-165). The compound has the following structure

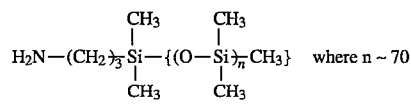

Other preferred materials are those in which the functional group is an alcohol.

Polyolefins

The polyolefins have the general formula:

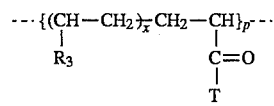

wherein T is OH; Cl; an anhydride; isocyanate; or $OR_6$ wherein $R_6$ is methyl, ethyl or propyl; and x is 1 to 1000 and p is 1 to 200. The anhydride can be the same as the poly olefin or an alkylanhydride such as acetylanhydride, benzoyl anhydride, etc.

The preferred materials are ethylene (acrylic acid) copolymers acid derivatives with a melt index in the range of 3 to 20 gm./10 min. These materials are available from Dow Chemical under the Brand name PRIMACOR®. Maleic acid anhydride polymers are also preferred.

The Copolymer

The copolymer is a chemically bonded block copolymer of the general formula

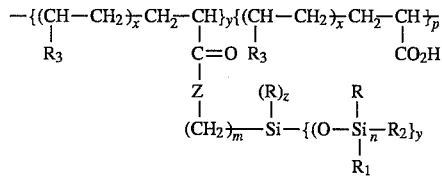

wherein:
  x=1 to 1000
  m=2 to 100
  n=0 to 1000
  y=1 to 3, z=0 to 2, wherein (y+z)=3 and
  p=1 to 200
wherein R and $R_1$ are independently selected from the group consisting of hydrogen, alkyl groups having 1 to 6 carbons, phenyl, benzyl or alkylphenyl having from 6 to 12 carbons; $R_2$ is selected from the group consisting of $C_1$ to $C_6$ alkyl, phenyl, benzyl or alkylphenyl having from 6 to 12 carbons; $R_3$ is hydrogen, methyl, ethyl or propyl; and Z is O, S, NH or NR' wherein R' is phenyl, $C_1$ to $C_4$ alkyl or $C_1$ to $C_3$ alkylphenyl.

Process for Making

Polyolefin and polysiloxane are added separately to a twin screw extruder or single screw extruder equipped to heat the materials while mixing and extruding the materials. The ratio of siloxane to olefin ranges from 10:1 to 1:100, preferably the range is from 1:1 to 1:100 ratio is used. This ratio of the two reactants is on a weight basis.

The extruder is configured to produce intimate mixing in zone 1 and heating and mixing in the other zones. The preferred extruder is a twin screw extruder. Twin screw extruders are available from a number of companies. The preferred extruder is the Werner and Pfleiderer ZSK70 and ZSK300 (Germany). The extruder is equipped with kneading screws and kneading discs.

The reactants are heated to 150° C. to 300° C. as they pass through the extruder. No solvent is used in the process. The extruder is vented to remove by-products formed during the reaction process. The mixing speed is from about 50 to about 350 rpm, preferably from about 200 to about 300, and most preferably from about 220 to about 260.

In a preferred process the extruder is divided into 7 zones. The polyolefin is fed into the first zone from a hopper. The polyolefin is heated to from about 150° C. to about 225° C. to plasticize. The second zone is heated to about the same temperature. This zone consists of a kneading/mixing section (about ⅓) followed by a pumping feeding section. The siloxane polymer is injected at the beginning of the third zone. This is a mixing section. It is heated to about 25° C. to 60° C. above the prior zones.

The fourth zone is at the same temperature. It is primarily a pumping and reaction zone. The fifth zone has a short kneading section (10% to 20% of its length). This latter section is under a vacuum which allows the by-products to be vented. The last zone is a pumping and discharging zone. The copolymer exits through a die.

The length of the extruder and the screw configurations can be varied as can the reaction temperatures.

This process has the advantage of being solventless and thermally activated.

The following examples are illustrative of the invention but are not limiting thereof.

EXAMPLE I

5% GE 1149-165 Compounded with PRIMACOR® 3460R

| 5% GE 1149-165 Compounded with PRIMACOR ® 346OR | |
|---|---|
| Twin Screw Compounder | Temperature °C. |
| Zone A | 200 |
| Zone B | 200 |
| Zone 1 | 239 |
| Zone 2 | 241 |
| Zone 3 | 239 |
| Zone 4 | 239 |
| Zone 5 | 239 |
| Melt Temp | 248 |
| Screw Speed (rpm) | 250 |
| Resin Feed Rate (rpm) | 23 |
| Die Pressure (psi) | 36 |
| Torque (%) | 20 |
| Vacuum ("Hg) | −25 |
| Gear Pump Input Pressure (psi) | 90 |
| Gear Pump Speed (rpm) | 13 |
| Gear Pump Output Pressure (psi) | 300–600 |
| Material Collected (lbs) | 20 |

The extrudate is white and smooth coming out of the die.

GE 1149-165 is an experimental monoamine terminated polydimethylsiloxane with an average molecular weight of 30,000 grams/ml. PRIMACOR® 3460R is a ethylene-acrylic acid copolymer available from Dow Chemical Corporation. It has a melt index of 20 and 9.5% acrylic acid.

The PRIMACOR® is fed into the first zone of a twin screw extruder that has been divided into seven zones. The PRIMACOR® is heated to about 200° C. to plasticize it. The second zone consists of a kneading/mixing section followed by a pumping feeding section. The polyolefin passes from the first zone into the second zone which is also at 200° C. The third zone is at a temperature of 239° C. and is equipped as a mixing section. The siloxane polymer is injected at the beginning of this zone. A pumping and reaction zone follows as the fourth zone. This is also held at a temperature of about 240° C. A fifth zone has a short kneading section approximately 10–20% of its length. It is under a vacuum (1 inch of mercury). This allows the by-products to be vented. The last zone is a pumping and discharging zone and it is held at a temperature of about 240° C.

EXAMPLE II

Reactive Extrusion of PRIMACOR® 3150 with 5% (wt.) GE 1149-165 Polydimethylsiloxane PRIMACOR® 3150, ethylene acrylic acid copolymer, 3% acrylic acid, melt index of 11 g./10 min; is introduced into the Werner and Pfleiderer twin screw extruder with 5% by weight GE 1149-165, ~30,000 MW amine terminated polydimethylsiloxane. The extruder is equipped as in Example I and these conditions are used.

| Twin Screw Compounder | Temperature °C. |
|---|---|
| Zone A (C) | 200 |
| Zone B (C) | 200 |
| Zone 1 (C) | 236 |
| Zone 2 (C) | 232 |
| Zone 3 (C) | 238 |
| Zone 4 (C) | 239 |
| Zone 5 (C) | 240 |
| Melt Temp (C.) | 248 |
| Screw Speed (rpm) | 247 |
| Resin Feed Rate (rpm) | 23 |
| Die Pressure (psi) | 40 |
| Torque (%) | 40–42 |
| Vacuum ("Hg) | −24 |
| Gear Pump Input Pressure (psi) | 90 |
| Gear Pump Speed (rpm) | 13 |
| Gear Pump Output Pressure (psi) | 300 |

The material extruded is white, smooth and slightly sticky/oily in feel.

EXAMPLE III

Reactive Extrusion of PRIMACOR® 3340 with 5% (wt.) GE 1149-165 Polydimethylsiloxane PRIMACOR® 3340, ethylene acrylic acid copolymer 6.5% acrylic acid, 9.0 g./10 min. melt index; was introduced into a Werner-Pfeiderer twin screw extruder as in Example I with 5 weight % GE 1149-165 amine terminated polydimethyl siloxane (30,000 MW avg.). The extrusion conditions are listed below. A white, smooth material was extruded which did not feel oily or tacky.

| Twin Screw Compounder | Temperature °C. |
|---|---|
| Zone A | 200 |
| Zone B | 200 |
| Zone 1 | 239 |

-continued

| Twin Screw Compounder | Temperature °C. |
|---|---|
| Zone 2 | 239 |
| Zone 3 | 240 |
| Zone 4 | 241 |
| Zone 5 | 241 |
| Melt Temp | 249 |
| Screw Speed (rpm) | 248 |
| Resin Feed Rate (rpm) | 23 |
| Die Pressure (psi) | 40–50 |
| Torque (%) | 40–42 |
| Vacuum ("Hg) | −24 |
| Gear Pump Input Pressure (psi) | 90 |
| Gear Pump Speed (rpm) | 13 |
| Gear Pump Output Pressure (psi) | 300 |

EXAMPLE IV

10% GE 1149-165 Compounded With 90% PRIMACOR® 3460R

PRIMACOR® 3460R, an ethylene acrylic copolymer available from Dow Chemical is reacted with 10% GE 1149-165 in a twin screw extruder as in Example I. The following conditions are used.

| Twin Screw Compounder | WK 1066-74 |
|---|---|
| Zone A | 200 |
| Zone B | 200 |
| Zone 1 | 241 |
| Zone 2 | 240 |
| Zone 3 | 241 |
| Zone 4 | 240 |
| Zone 5 | 240 |
| Melt Temp | 248 |
| Screw Speed (rpm) | 248 |
| Resin Feed Rate (rpm) | 23 |
| Die Pressure (psi) | 20 |
| Torque (%) | 32 |
| Vacuum ("Hg) | −25 |
| Gear Pump Input Pressure (psi) | 90 |
| Gear Pump Speed (rpm) | 25 |
| Gear Pump Output Pressure (psi) | 950 |

Extrudate was white and smooth coming out of the die.

EXAMPLE V 2.5% GE 1149-165 Compounded with 97.5% PRIMACOR® 3460R

GE 1149-165 is a mono-amine terminated polydimethylsiloxane with an average molecular weight of 30,000 g/ml. It is reacted with PRIMACOR® 3460R as in Example I. The following conditions are used.

| Twin Screw Compounder | Temperature °C. |
|---|---|
| Zone A | 200 |
| Zone B | 200 |
| Zone 1 | 240 |
| Zone 2 | 246 |
| Zone 3 | 241 |
| Zone 4 | 239 |
| Zone 5 | 235 |
| Melt Temp | 243 |
| Screw Speed (rpm) | 250 |
| Resin Feed Rate (rpm) | 23 |
| Die Pressure (psi) | 38 |
| Torque (%) | 20 |
| Vacuum ("Hg) | −25 |
| Gear Pump Input Pressure (psi) | 90 |
| Gear Pump Speed (rpm) | 6.5 |
| Gear Pump Output Pressure (psi) | 0–300 |

An acceptable polymer is made.

Uses:

The polymers of this invention are thermoplastic, melt processable, coextrudable into very thin layers and heat sealable to themselves and other compatible polymers. These properties give them a number of uses.

A. Adhesive Release—The siloxane modified polyolefin polymers can be used alone as adhesive release materials. The polymers are coated onto paper fiber or film to make adhesive release materials. The adhesive and the silicone must be compatible so that the adhesive is not dissolved by the polymer or its adhesive properties reduced by partial solution or reaction with the polymer. It is important that the silcone does not transfer or contaminate the adhesive.

B. Film and Packaging—The polymer can be extruded or co-extruded with a polyolefin or other polymer to make films and packages. The copolymer of this invention provides the silicone properties of adhesive release, fast draining, non-drip and water resistant yet it is compatible with other olefin polymers such as polyethylene. It can be coextruded into very thin layers simultaneously with another layer of polymer to make a permanently affixed silcone film on the polyethylene or other compatible polymer. It can also be blown or cast into a multilayer film or coextruded as a thin layer on a bottle or other package.

The copolymers can be used to make liquid dispensing packages such as those described in U.S. Pat. No. 4,696,416 issued to Muckenfuhs, et al. (1987), and U.S. Pat. No. 5,181,630 issued to McNally (1993). They can also be used to make articles which contain a segment which can be elastically sheared, as, for example, the articles described in U.S. Pat. No. 4,908,247 issued to Baird, et al. (1990).

Characterization of the Product

An important property of the material is that the copolymers are chemically bonded. This means that the siloxane will not separate from the polymer. Physical mixtures or ionically bonded copolymers tend to separate on standing. This causes the siloxane to be lost. As it migrates to surface, an oily film forms making the film, package or sheet feel greasy. The siloxane can also migrate into the materials or food wrapped or packaged in the polymer.

The polymers formed herein do not suffer this disadvantage. X-ray photoemission spectroscopy shows that the surface of the film is primarily silcone. Transmission electron microscopy confirms that the materials are chemically bonded and not just mixed.

What is claimed is:

1. A copolymer having the formula:

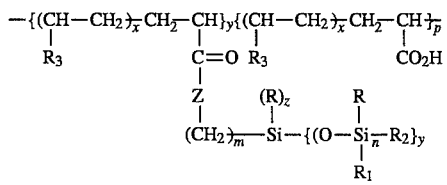

wherein:

x=1 to 1000 m=2 to 100 n=0 to 1000 y=1 to 3, z=0 to 2, wherein (y+z)=3, and p=1 to 200 wherein each R and $R_1$ are independently selected from the group consisting of hydrogen, alkyl groups having from 1 to 6 carbons, phenyl, benzyl and alkylphenyl having from 6 to 12 carbons; $R_2$ is selected from the group consisting of $C_1$ to $C_6$ alkyl, phenyl, benzyl and alkylphenyl having from 6 to 12 carbons; $R_3$ is selected from the group consisting of hydrogen, methyl, ethyl and propyl; and Z is selected from the group consisting of O, S, NH and NR' wherein R' is selected from the group consisting of phenyl, $C_1$ to $C_4$ alkyl and $C_1$ to $C_3$ alkylphenyl.

2. A copolymer according to claim 1 wherein

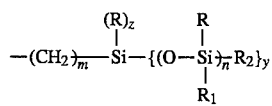

has an average molecular weight in the range of 5,000 to 300,000 Mw.

3. A copolymer according to claim 2 wherein

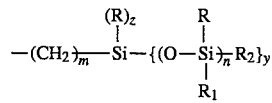

has an average molecular weight in the range of 8,000 to 200,000 Mw.

4. A copolymer according to claim 1 wherein Z is NH and wherein R and $R_2$ are methyl and n is 70.

5. A copolymer according to claim 4 wherein the average molecular weight of

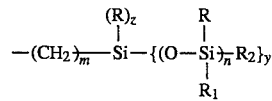

is from about 10,000 to about 30,000 Mw.

6. A copolymer according to claim 1 wherein Z is oxygen.

7. A copolymer according to claim 2 wherein R, $R_1$ and $R_2$ are selected from the group consisting of hydrogen, alkyl having from 1 to 6 carbons, phenyl and styryl.

8. An adhesive releasable material comprising the copolymer according to claim 1.

* * * * *